United States Patent [19]

Engels et al.

[11] Patent Number: 4,975,162
[45] Date of Patent: Dec. 4, 1990

[54] REMOVAL OF CADMIUM FROM PHOSPHORIC ACID-CONTAINING SOLUTIONS

[75] Inventors: Karl R. Engels, London, England; Arjen Nieuwhof; Johannus B. J. Spijkerman, both of AT Arnhem, Netherlands

[73] Assignee: Shell Research Limited, London, United Kingdom

[21] Appl. No.: 377,448

[22] Filed: Jul. 10, 1989

[30] Foreign Application Priority Data

Jul. 11, 1988 [GB] United Kingdom ............... 8816439

[51] Int. Cl.$^5$ ............................................. C25C 1/16
[52] U.S. Cl. .................................... 204/114; 204/130
[58] Field of Search ............................... 204/114, 130

[56] References Cited

U.S. PATENT DOCUMENTS 4,244,795 1/1981 Raats ............................... 204/105 R

FOREIGN PATENT DOCUMENTS 0028158 5/1981 European Pat. Off. .

OTHER PUBLICATIONS

Greene, R., editor, Chemical Engineering, "Flow-through Porous Electrodes", pp. 57–67 (2/21/83).

Primary Examiner—T. M. Tufariello

[57] ABSTRACT

Process for the removal of cadmium from an aqueous, acidic, cadmium containing solution by electrodepositing the cadmium on conducting particulates present in a packed or fluidized bed cathode compartment of an electrolysis cell in which the aqueous, acidic, cadmium-containing solution contains phosphoric acid. The process is of particular interest for the removal of cadmium from phosphoric acid solutions which are obtained during the production of phosphorus-containing fertilizers from phosphorus rock.

5 Claims, No Drawings

REMOVAL OF CADMIUM FROM PHOSPHORIC ACID-CONTAINING SOLUTIONS

The invention relates to a process for the removal of cadmium from an aqueous, acidic, cadmium-containing solution by electro-depositing the cadmium on conducting particulates present in a packed or fluidized bed cathode compartment of an electrolysis cell.

The invention is of particular interest for the removal of cadmium from phosphoric acid solutions which are obtained during the production of phosphorus-containing fertilizers (especially triple superphosphate and ammonium phosphate) from phosphate rock.

Since phosphorus in phosphate rock occurs in mineral forms that are not readily absorbed by plants or vegetation in general (e.g. $Ca_{10}(PO_4)_6F_2$, $Ca_{10}(PO_4)_6(OH)_2$, and $Ca_{10}(PO_4)_6(CO_3)$), treatment is necessary to make the phosphorus "soluble".

This treatment usually comprises reaction of the phosphate rock with concentrated sulphuric acid to produce phosphoric acid (complete conversion) which is used for the production of ammonium phosphate and triple superphosphate or to produce monocalcium phosphate ($CaH_4(PO_4)_2.2H_2O$) and dicalcium phosphate ($CaHPO_4$) (partial conversion), which compounds are used for the production of superphosphate. Further, calcium sulphate is formed.

When phosphoric acid is produced the calcium sulphate is obtained as a separated side-product which has to be dumped as waste or can be used for the production of gypsum. When calcium phosphates are produced the calcium sulphate usually will become part of the fertilizer.

As the starting phosphate rocks often contain a minor amount of cadmium (usually up to 50 ppm), the resulting products will also contain a certain amount of cadmium. In view of the cumulating amounts of the very harmful cadmium present in fertilizers, waste and/or gypsum already produced in the past and to be produced in the future, it is desirable to remove cadmium during the production of phosphorus-containing fertilizers, for instance from phosphoric acid solutions obtained during this process. Thus, environmental contamination due to cadmium may be decreased significantly.

The present invention, now, relates to a process for the removal of cadmium from aqueous, phosphoric acid-containing solutions. Such solutions may be obtained during the production of phosphorus-containing fertilizers. It has been found that cadmium can be removed from aqueous, phosphoric acid-containing solutions using a packed or fluidized bed electrolysis process, in which the cadmium is deposited on the particulates present in the cathode compartment.

The invention, therefore, relates to a process for the removal of cadmium from an aqueous, acidic, cadmium-containing solution by electrodepositing the cadmium on conducting particulates present in a packed or fluidized bed cathode compartment of an electrolysis cell in which the aqueous, acidic, cadmium-containing solution contains phosphoric acid.

Application of the process of the present invention on phosphoric acid-containing solutions obtained during the production of fertilizers may remove 90% or more of the cadmium present, thus resulting in a very clear diminishment of the cadmium burden on the environment.

The packed and fluidized bed electrolysis cells as used for the removal of cadmium from aqueous, acidic solutions are well known in the art, as appears for instance from U.S. Pat No. 4,244,795 and "Chemical Engineering", Feb. 21, 1983, p 57–67. The electrolysis cells comprise a particulate cathode, one or more conventional anodes and one or more diaphragms, preferably the latter are conceived as tubes or pipes surrounding the anodes. The particulate cathode may be fluidized by adjusting the flow of catholyte. A convenient method for assessing the state of fluidization is by measuring bed expansion. One or more current feeders, e.g. wires, rods, strips, plates, tubes or pipes, that are dipped into the particulate cathode, ensure adequate distribution of current over all particles.

The electrolysis cell may be provided in addition to the particulate cathode also with a particulate anode.

The aqueous, acidic, cadmium-containing solution used in the process of the present invention suitably contains between 1 and 700 g phosphoric acid per liter, preferably between 20 and 600 g phosphoric acid per liter, more preferably between 70 and 400 g phosphoric acid per liter. In addition to phosphoric acid the solution may also contain a certain amount of sulphuric acid, usually between 20 and 100 g per liter. Further chloride ions may be present in an amount up to 50 g per liter.

The amount of cadmium present in the aqueous, acidic solution is usually below 1000 mg/l. A suitable concentration is below 100 mg/l, preferably below 50 mg/l, more preferably below 20 mg/l. The minimum amount of cadmium is usually 0.1 mg/l, suitably 1 mg/l or more. Beside cadmium also other metals may be present in the aqueous, acidic solution, e.g. Cr, Cu, Zn, Ni. Pb, As, Hg, V, Mn, Co etc. Usually the upper limit of these elements does not exceed 500 mg/l, and is often lower. Further aluminium, iron, sodium, potassium, calcium and magnesium may be present in amounts up to 5 g/l.

The aqueous, acidic. cadmium-containing solution is preferably obtained by reaction of phosphate rock and concentrated sulphuric acid, possibly followed by further processing. Suitable process streams are "production acid", concentrated phosphoric acid streams and filtrates from calcium sulphate crystallizations or recrystallizations. The concentrated sulphuric acid stream used for the reaction with phosphate rock suitably contains at least 80% (w/w) of sulphuric acid, usually at least 92% (w/w) of sulphuric acid.

The conducting particulates present in the packed or fluidized bed cathode are suitably metal particles or graphite. The preferred metal is copper. In order to raise the hydrogen overvoltage and thus to minimize hydrogen formation and loss of electrical energy, preferably amalgated metals are used. The most preferred particulates are amalgated copper particulates. Suitable particle sizes are between 0.2 and 4 mm, preferably between 0.4 and 1.4 mm The bed expansion in fluidized bed cells is suitably between 10 and 30%. The conducting particles will grow due to the deposition of cadmium (and possibly other metals as e.g. copper). In consequence, the particles become heavier during electrolysis and gradually sink to the bottom. The process can be operated continuously by adding small particles at the top of the cathode compartment and discharging grown particles from the bottom. It is also possible to remove in a non-continuous procedure all or part of the particulates, for instance when a certain amount of cadmium has been deposited on the particulates or simply after a certain period of time, and to replace the removed particulates by a fresh amount. The removed particulates may be regenerated by removal of the cadmium, for instance by treatment with phosphoric and/or sulphuric acid or by an electrochemical process. This type of non-continuous process may be applied using fluidized as well as packed beds, and is preferably performed in a "swing-bed" type of operation.

cell with a particulate packed bed cathode, a Daramic diaphragm (effective surface area 80 cm$^2$) and a lead/silver plate anode. The catholyte (4 l) was depleted in batch experiments by recirculation through the cathode. Samples from the catholyte were taken at regular intervals for chemical analysis. Pure phosphoric acid of equivalent concentration was used as anolyte. The gases from both catholyte and anolyte circuit were sucked off continuously. The results of the experiments are described in Table II.

TABLE II

| Exp. | Solution | Cathode particulates | Current density A/m$^2$ | Cell voltage V | Flow l/h | Concentration Cd, mg/l start | final | Current efficiency % |
|---|---|---|---|---|---|---|---|---|
| 1 | 1 | Cu(Hg) | 416 | 3.0 | 700 | 8 | 0.1 | 0.17 |
| 2 | 1 | graphite | 208 → 416 | 2.7 | 700 | 8 | 3.0 | 0.07 |
| 3 | 1 | Cu(Hg) | 208 | 3.2 | 700 | 8 | 0.1 | 0.49 |
| 4 | 2 | Cu(Hg) | 208 | 2.6 | 700 | 3 | 0.8 | 0.02 |
| 5 | 2 | Cu(Hg) | 208 | 2.5 | 700 | 3 | 0.5 | 0.08 |
| 6 | 2 | Cu(Hg) | 416 | 3.2 | 700 | 3 | 0.2 | 0.06 |
| 7 | 3 | Cu(Hg) | 125 | 2.6 | 600 | 14 | 4.6 | 0.26 |
| 8 | 3 | Cu(Hg) | 125 | 1.8 | 500 | 14 | 6.2 | 0.16 |
| 9 | 4 | Cu(Hg) | 219 | 10.7 | 200 | 24 | 17 | 0.14 |
| 10 | 4 | Cu(Hg) | 250 | 12.8 | 400 | 24 | 13 | 0.20 |

The process of the present invention is suitably carried out between 5° C. and 65° C., preferably between 15° C. and 40° C. The current density through a reference surface from the cross-section of the electrolysis cell is between 20 and 2000 A/m$^2$, preferably between 100 and 500 A/m$^2$. The resulting cell voltage is generally between 1.8 and 25 V, preferably between 2.2 and 12. The cadmium removal is often 20% or more, but is preferably 80% or more. Current efficiencies are usually between 0.01 and 0.5%.

The cadmium deposited on the particulates in the cathode compartment may be isolated in known ways from the other metals present in the particulates. Preferably the cathode particulates are regenerated by treatment with phosphoric acid and/or sulphuric acid. It can be used for all known applications of cadmium.

The invention also relates to the aqueous, acidic solutions containing phosphoric acid obtained after (almost) complete or partial removal of cadmium according to the process of the invention, to the use of these solutions for the production of fertilizers as well as to the fertilizers thus obtained.

EXAMPLE

Four solutions were used to illustrate the invention. The compositions of these solutions are described in Table I. Besides the components indicated in the table minor amounts of a number of metals were present.

TABLE I

| Solution | H$_3$PO$_4$ (in % P$_2$O$_5$ w/w) | SO$_4^{2-}$ (% w/w) | Cl$^-$ (% w/w) | F$^-$ (% w/w) | Cd (mg/l) | Density (kg/l) |
|---|---|---|---|---|---|---|
| 1 | 2.4 | 2.8 | 3.8 | — | 8 | 1.2 |
| 2 | 8.0 | 5.8 | — | 1.7 | 3 | 1.1 |
| 3 | 27 | 2.8 | — | 1.5 | 14 | 1.3 |
| 4 | 52 | 3.8 | — | 0.7 | 24 | 1.7 |

Cadmium was removed from the four solutions as described above, using a standard sandwich laboratory

We claim:

1. Process for the removal of cadmium from an aqueous, acidic, cadmium-containing solution comprising electrodepositing the cadmium on conducting particulates present in a packed or fluidized bed cathode compartment of an electrolysis cell; in which said aqueous, acidic, cadmium-containing solution contains between 20 and 600 g phosphoric acid per liter, between 20 and 100 g sulphuric acid per liter and less than 50 mg per liter of cadmium and is obtained by processing comprising reaction of phosphate rock and concentrated sulphuric acid; in which said conducting particulates are amalgated copper particulates having diameters between 0.2 and 4 mm; in which the current density through a reference surface from the cross-section of the electrolysis cell is between 20 and 2000 A/m$^2$; and in which the cell voltage is between 2.2 and 12 V.

2. The process of claim 1, in which the aqueous, acidic solution contains between 70 and 400 g phosphoric acid per liter.

3. The process of claim 1, in which the diameter of the conducting particulates is between 0.4 and 1.4 mm.

4. The process of claim 1, in which the aqueous, acidic solution contains between 70 and 400 g phosphoric acid per liter, between 200 and 100 g sulphuric acid per liter and less than 20 mg/l of cadmium and is obtained by processing comprising reaction of phosphate rock and concentrated sulphuric acid, in which the conducting particulates are amalgated copper particulates having diameters between 0.4 and 1.4 mm, in which the current density through a reference surface from the cross-section of the electrolysis cell is between 100 and 500 A/m$^2$, in which the cell voltage is between 2.2 and 12 V and in which at least 80% of the cadmium is removed.

5. The process of claim 1 in which the aqueous, acidic solution contains at least 0.1 mg per liter of cadmium.

* * * * *

UNITED STATES PATENT AND TRADEMARK OFFICE
CERTIFICATE OF CORRECTION

PATENT NO. : 4,975,162

DATED : December 4, 1990

INVENTOR(S) : Karl R. Engels et al

It is certified that error appears in the above-identified patent and that said Letters Patent is hereby corrected as shown below:

Claim 4 (column 4, line 50), "200" should be --20--.

Signed and Sealed this

Twenty-first Day of April, 1992

Attest:

HARRY F. MANBECK, JR.

*Attesting Officer*  *Commissioner of Patents and Trademarks*